(12) United States Patent
Mehta et al.

(10) Patent No.: US 8,913,551 B2
(45) Date of Patent: Dec. 16, 2014

(54) ANTENNA SELECTION WITH FREQUENCY-HOPPED SOUNDING REFERENCE SIGNALS

(75) Inventors: Neelesh B. Mehta, Bangalore (IN); Koon Hoo Teo, Lexington, MA (US); Jinyun Zhang, Cambridge, MA (US); Gennadiy V. Vinokur, Salem, MA (US); Man-On Pun, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 996 days.

(21) Appl. No.: 13/002,295

(22) PCT Filed: Jun. 24, 2009

(86) PCT No.: PCT/US2009/048512
§ 371 (c)(1),
(2), (4) Date: Sep. 8, 2011

(87) PCT Pub. No.: WO2010/008897
PCT Pub. Date: Jan. 21, 2010

(65) Prior Publication Data
US 2011/0310931 A1    Dec. 22, 2011

Related U.S. Application Data

(60) Provisional application No. 61/075,102, filed on Jun. 24, 2008, provisional application No. 61/076,743, filed on Jun. 30, 2008, provisional application No. 61/077,301, filed on Jul. 1, 2008, provisional application No. 61/077,723, filed on Jul. 2, 2008.

(51) Int. Cl.
*H04W 4/00* (2009.01)
*H04L 5/00* (2006.01)
*H01Q 1/24* (2006.01)
*H01Q 25/00* (2006.01)
*H01Q 3/24* (2006.01)
*H04W 28/16* (2009.01)
*H04W 88/02* (2009.01)

(52) U.S. Cl.
CPC ............... *H01Q 3/24* (2013.01); *H04L 5/0048* (2013.01); *H04L 5/0023* (2013.01); *H04W 28/16* (2013.01); *H01Q 1/246* (2013.01); *H04W 88/02* (2013.01); *H01Q 25/00* (2013.01)
USPC ........... 370/328; 370/203; 370/210; 375/132; 455/561

(58) Field of Classification Search
None
See application file for complete search history.

(56) References Cited

U.S. PATENT DOCUMENTS 6,654,408 B1    11/2003  Kadous et al.
7,526,258 B2 *   4/2009  Nakao et al. .................. 455/101

(Continued)

OTHER PUBLICATIONS

"Frequency Hopping Arrangement for SRS," Nokia Siemens Networks, 3GPP TSG RAB WG1 Meeting #53 R1-081864, May 5-9, 2008.

*Primary Examiner* — Bob Phunkulh
(74) *Attorney, Agent, or Firm* — Dirk Brinkman; Gene Vinokur

(57) ABSTRACT

The embodiments of the invention provide a method for selecting antennas for date transmission in a wireless communication network including user equipment (UE). The network is assigned a band of frequencies, wherein the band is partitioned into at least one set of subbands of the band according to a sounding reference signal (SRS) bandwidth configuration in a form of a codetree having a plurality levels and each level is associated with a partition coefficient. The UE is configured to transmit frequency-hopped SRS on the set of subbands using subsets of the set of antennas. First, the method determines if a number of subbands in the set of the subbands is odd or even based on the SRS bandwidth configuration, and selects a particular subset of the antennas according to whether the number is odd or even. Then, the SRS is transmitted from the particular subset of the antennas.

17 Claims, 16 Drawing Sheets

(56) References Cited

U.S. PATENT DOCUMENTS

| | | |
|---|---|---|
| 8,553,795 B2 * | 10/2013 | Xu et al. .................. 375/267 |
| 2002/0191535 A1 | 12/2002 | Sugiyama et al. |
| 2004/0178954 A1 | 9/2004 | Vook et al. |
| 2006/0233124 A1 | 10/2006 | Molnar et al. |
| 2007/0248113 A1 * | 10/2007 | Ko et al. .................. 370/436 |
| 2008/0043615 A1 | 2/2008 | Li et al. |
| 2008/0051149 A1 | 2/2008 | Mehta et al. |
| 2008/0267318 A1 * | 10/2008 | Ihm et al. .................. 375/299 |
| 2009/0011767 A1 * | 1/2009 | Malladi et al. .................. 455/450 |
| 2009/0042615 A1 * | 2/2009 | Teo et al. .................. 455/562.1 |
| 2009/0042616 A1 * | 2/2009 | Teo et al. .................. 455/562.1 |
| 2009/0238241 A1 * | 9/2009 | Hooli et al. .................. 375/133 |
| 2009/0316756 A1 * | 12/2009 | Ro et al. .................. 375/133 |
| 2010/0220808 A1 * | 9/2010 | Kishigami et al. .................. 375/295 |
| 2010/0296591 A1 * | 11/2010 | Xu et al. .................. 375/259 |

\* cited by examiner

200

300

700

1100

ANTENNA SELECTION WITH FREQUENCY-HOPPED SOUNDING REFERENCE SIGNALS

RELATED APPLICATIONS

The following patent applications are related to the present application, and incorporated herein by reference:

U.S. patent application Ser. No. 11/953,452, filed Dec. 10, 2007, entitled "Method and System for Generating Antenna Selection Signals in Wireless Networks;"

U.S. patent application Ser. No. 12/055,522, filed Mar. 26, 2008, entitled "Method for Selecting Antennas in a Wireless Networks;"

U.S. patent application Ser. No. 11/924,703, filed Oct. 26, 2007, entitled "Method for Implicit Selecting Antennas in a Wireless Networks;"

U.S. patent application Ser. No. 11/834,345, filed Aug. 6, 2007, entitled "Method for Selecting Antennas in a Wireless Networks;"

U.S. Provisional Patent Application No. 61/075,102, filed Jun. 24, 2008, entitled "Tree-Based Frequency-Hopped Sounding Reference Signals for Transmit Antenna Selection Training;"

U.S. Provisional Patent Application No. 61/076,743, filed Jun. 30, 2008, entitled "Tree-Based Frequency-Flopped Sounding Reference Signals for Transmit Antenna Selection Training;"

U.S. Provisional Patent Application No. 61/077,301, filed Jul. 1, 2008, entitled "Tree-Based Frequency-Hopped Sounding Reference Signals for Transmit Antenna Selection Training;" and U.S. Provisional Patent Application No. 61/077,723, filed Jul. 2, 2008, entitled "Tree-based frequency-hopped sounding reference signals for transmit antenna selection training with antenna index."

FIELD OF THE INVENTION

This invention relates generally to antenna selection in wireless communication networks, and more particularly to selecting antennas with frequency-hopped sounding reference signals (SRS).

BACKGROUND OF THE INVENTION

OFDMA and SC-FDMA

In a wireless communication network, such as the $3^{rd}$ generation (3G) wireless cellular communication standard and the 3GPP long term evolution (LTE) standard, it is desired to concurrently support multiple services and multiple data rates for multiple users in a channel with a fixed bandwidth. The network bandwidth can vary, for example, from 125 MHz to 20 MHz. The network bandwidth is partitioned into a number of subbands, e.g., 1024 subbands for a 10 MHz bandwidth.

One scheme adaptively modulates and encodes symbols, before transmission, based on estimates of a channel. Another option available in LTE, which uses orthogonal frequency division multiplexed access (OFDMA), is to use multi-user frequency diversity by assigning different subbands or groups of subbands to different users or UEs (user equipment, mobile station (MS)).

In the single band frequency division multiple access (SC-FDMA) uplink of the LTE, in each UE, the symbols are spread by means of a discrete Fourier transform (DFT) matrix. Then, the symbols are assigned to different subbands.

The following standards are applicable: 36.211, 3rd Generation Partnership Project; Technical Specification Group Radio Access Network: Physical Channels and Modulation (Release 8), v 1.0.0 (2007-March); RI-01057, "Adaptive antenna switching for radio resource allocation in the EUTRA uplink," Mitsubishi Electric/Nortel/NTT DoCoMO, 3GPP RAN1#48,; R1-071119, "A new DM-RS transmission scheme for antenna selection in E-UTRA uplink," LGE, 3GPP RAN1#48,; and "Comparison of closed-loop antenna selection with open-loop transmit diversity (antenna switching within a transmit time interval (TTI))," Mitsubishi Electric, 3GPP RAN1#47bis, Sorrento, Italy. According to the 3GPP standard, the base station (BS) is enhanced, and is called the "Evolved NodeB" (eNodeB). The terms BS and eNodeB are used interchangeably.

Multiple Input Multiple Output (MIMO)

To further increase the capacity of the wireless communication network in fading channel environments, multiple-input-multiple-output (MIMO) antenna technology can be used without an increase in bandwidth. Because the channels for different antennas are different, MIMO decreases fading, and also enables multiple data streams to be transmitted concurrently.

However, processing the signals received in spatial multiplexing schemes, or with space-time trellis codes requires transceivers where the complexity can increase exponentially as a function of the number of antenna.

Antenna Selection

Antennas are relatively simple and cheap, while RF chains are considerably more complex and expensive. Antenna selection reduces some of the complexity drawbacks associated with MIMO networks. Antenna selection reduces the hardware complexity of transmitters and receivers in the transceivers by using fewer RF chains than the number of antennas.

During antenna selection, a subset of the set of available antennas is adaptively selected by a switch, and only signals for the selected subset of antennas are connected to the available RF chains for signal processing, which can be either transmitting or receiving. The selected subset can include one or more of the available antennas.

Pilot Tones or Reference Signals

To select the optimal subset of antennas, channels corresponding to available subsets of antennas need to be estimated, even though only a selected optimal subset of the antennas is eventually used for transmission.

This can be achieved by transmitting antenna selection signals, e.g., pilot tones, also called sounding reference signals (SRS), from different antenna subsets. The different antenna subsets can transmit either the same pilot: tones, or use different pilot tones. Let $N_t$ denote the number of transmit antennas, $N_r$ the number of receive antennas, and let $R_t=N_t/L_t$ and $R_r=N_r/L_r$ be integers. Then, the available transmit (receive) antennas can be partitioned into $R_t$ ($R_r$) disjoint subsets.

The pilot repetition approach repeats, for $R_t \times R_r$ times, a training sequence that is suitable for an $L_t \times L_r$ MIMO network. During each repetition of the training sequence, the transmit RF chains are connected to different subsets of the antennas. Thus, at the end of the $R_t \times R_r$ repetitions, the receiver has a complete estimate of all the channels from the various transmit antennas to the various receive antennas.

In case of transmit antenna selection in frequency division duplex (FDD) networks, in which the forward and reverse channels are not identical, the transceiver feeds back the optimal subset of antennas to the transmitter. In reciprocal time division duplex (TDD) networks, the transmitter can perform the selection independently.

For an indoor local area network (LAN) with slowly varying channels, antenna selection can be performed using a media access (MAC) layer protocol, see IEEE 802.11n wireless LAN draft specification, I. P802.11n/D1.0, "Draft amendment to Wireless LAN media access control (MAC) and physical layer (PHY) specifications: Enhancements for higher throughput," Tech. Rep., March 2006.

Instead of extending the physical (PHY) layer preamble to include the extra training fields (repetitions) for the additional antennas, antenna selection training is done at the MAC layer by issuing commands to the physical layer to transmit and receive packets by different antenna subsets. The training information, which is a single conventional training sequence for an $L_t \times L_r$ MIMO network, is embedded in the MAC header field.

SC-FDMA Structure in LTE

The basic uplink transmission scheme is described in 3GPP TR 25.814, v1.2.2 "Physical Layer Aspects for Evolved UTRA." The scheme is a single-band transmission (SC-FDMA) with cyclic prefix (CP) to achieve uplink inter-user orthogonality and to enable efficient frequency-domain equalization at the receiver.

Broadband Sounding Reference Signals (SRS)

The broadband SRS helps the eNodeB to estimate the entire frequency domain response of the uplink channel from the UE to the eNodeB. This helps frequency-domain scheduling, in which a subband is assigned to the UE with the best gain on the uplink channel for that subband. Therefore, the broadband SRS can use the entire bandwidth, e.g., 5 MHz or 10 MHz, or a portion thereof as determined by the eNodeB. In the latter case, the broadband SRS is frequency hopped over multiple transmissions to cover the entire network bandwidth.

SUMMARY OF THE INVENTION

The embodiments of the invention describe a method for selecting antennas for data transmission in a wireless communication network including user equipment (UE). The network is assigned a band of frequencies, wherein the band is partitioned into at least one set of subbands of the band according to a sounding reference signal (SRS) bandwidth configuration in a form of a code-tree having a plurality levels and each level is associated with a partition coefficient. The UE is configured to transmit frequency-hopped SRS on the set of subbands using subsets of the set of antennas. First, the method determines if a number of subbands in the set of subbands is odd or even based on the SRS bandwidth configuration, and selects a particular subset of the antennas according to whether the number is odd or even. Then, the SRS is transmitted from the particular subset of the antennas.

The execution of the method depends on whether a value of the product is odd or even. In one embodiment, the number of subbands is odd, and the method determines an index parameter $a(n_{SRS})$ of the particular subset of antennas according to a $(n_{SRS})=n_{SRS} \bmod 2$. wherein $n_{SRS}$ is an index of a transmission of the SRS.

In another embodiment, the number of subbands is even, and the method determines the index parameter of the particular subset of antennas according to $$a(n_{SRS}) = \left( n_{SRS} + \left\lfloor \frac{n_{SRS}}{\prod_{b=0}^{b} N_b} \right\rfloor \bmod 2 \right) \bmod 2,$$

wherein b is a level of the segments in a code-tree based SRS allocation, and $N_b$ is a partitioning coefficient of the b level segments.

In yet another embodiment, the number of subbands is odd, and a number of subsets in the set of antennas is even, and the method determines the index parameter of the particular subset of antennas according to $a(n_{SRS})=n_{SRS} \bmod x_a$, wherein $x_a$, is the number of subsets in the set of the antennas.

In alternative embodiment, the number of subbands is even, and a number of subsets in the set of antennas is odd, and the method determines the index parameter of the particular subset of antennas according to $$a(n_{SRS})=n_{SRS} \bmod x_a.$$

DETAILED DESCRIPTION OF THE PREFERRED EMBODIMENTS

Network Overview

Figure 1A:
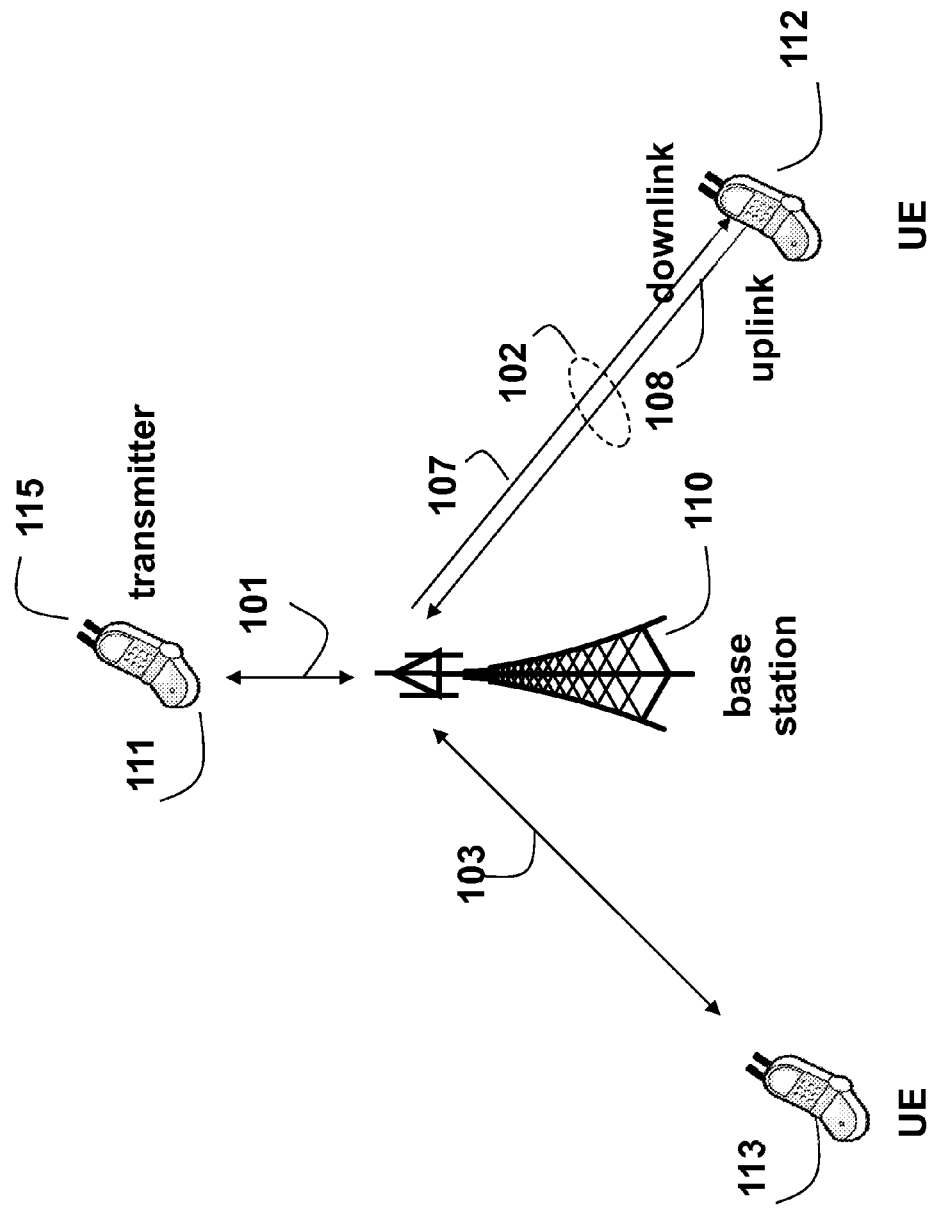
FIG. 1A is a block diagram of a wireless network according to an embodiment of the invention.

FIG. 1 shows a (general structure of a wireless network according to an embodiment of the invention. In one embodiment, the network operates according to the 3GPP long term evolution standard (LTE). Multiple mobile user equipments (UEs) 111-113 communicate with a stationary base station (BS) 110. Each UE and the BS includes a transceiver.

The BS is called an evolved Node B (eNodeB) in the LTE standard. The BS manages and coordinates all communications with the UEs in a cell using wireless channels or connections 101, 102, 103. Each connection can operate as a downlink (DL) 107 from the BS station to the UE or as an uplink 108 from the UE to the BS. Because the transmission power available at the BS is orders of magnitude greater than the transmission power at the UE, the performance on the uplink is much more critical.

Figure 1B:
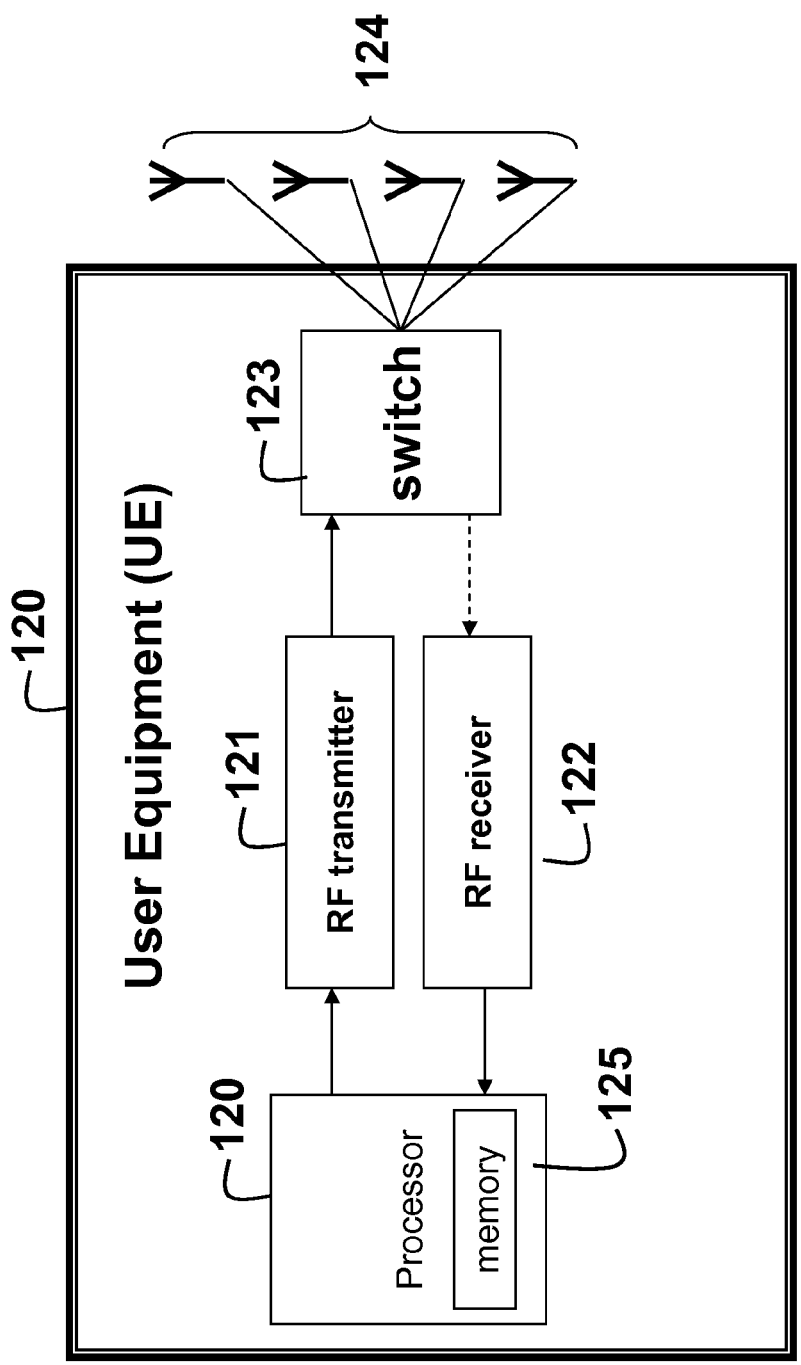
FIG. 1B is a block diagram of user equipment according to an embodiment of the invention.

FIG. 1B is a block diagram of detail of UE 120. UE includes a processor for performing steps of the method described herein. The processor 121 connected to a RF transmitter 121 and a RF receiver 121. The processor includes a memory 125. The transmitter and the receiver are connected to a set of antennas 124 via a switch, so one or more antennas can either transmit or receive signals. As shown, the switch is configured to transmit.

To perform wireless communication, the BS and the UEs are equipped with at least one RF chain and a set of antennas. Normally, the number of antennas and the number RF chains are equal at the BS. The number of antennas at the BS can be quite large, e.g., eight or more. However, due to the limitation on cost, size, and power consumption, UEs usually have fewer antennas 115, e.g., two or four. Therefore, antenna training and selection is performed at the UEs.

Generally, antennas selection selects a subset of antennas from the set of available antennas at the UE. The antennas selection includes the training, which is used for generating and transmitting and receiving antenna selection signals. The embodiments of the invention enable the network to accommodate UEs different bandwidths for sounding reference signals (SRS) in an orthogonal manner, and use the limited, resource of the SRS.

LTE Frame Structure

Figure 3A:
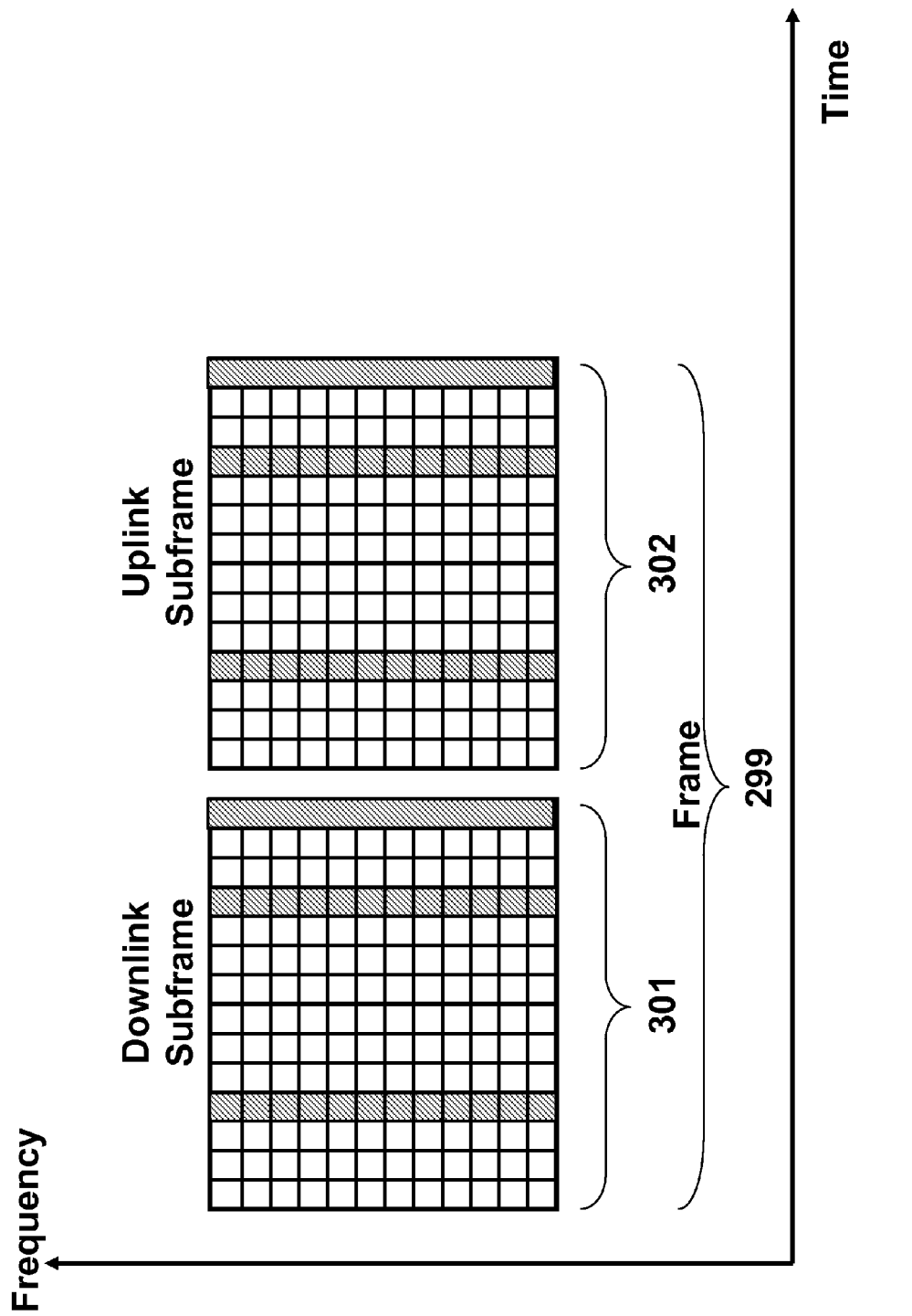
FIG. 3A is a block diagram of a frame according to an embodiment of the invention.

As shown in FIG. 3A, transmissions on the uplink and downlink are organized into frames 299. Each frame includes a downlink subframe 301 and an uplink subframe 302. Each frame is 10 ms, and includes of 20 slots of 0.5 ms each.

Figure 2:
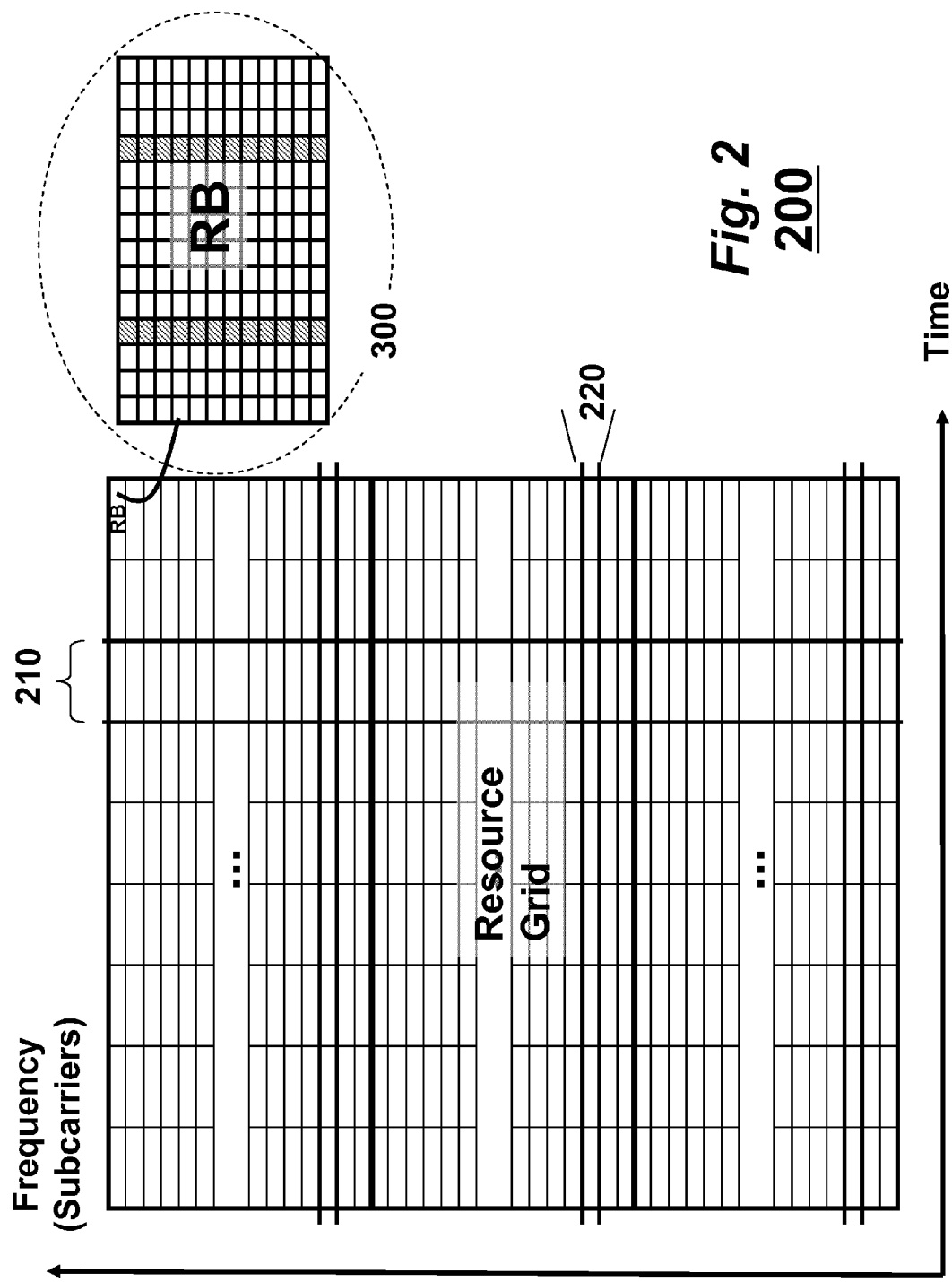
FIG. 2 is a block diagram of an uplink resource grid according to an embodiment of the invention.

FIG. 2 shows the structure of a SC-FDMA (single band frequency division multiple access) uplink resource grid 200. The horizontal axis indicates time, or SC-FDMA symbols and the vertical axis indicates frequency or subbands. The number of subbands depends on the bandwidth of the network, which can range from 125 MHz to 20 MHz, for example.

The uplink resource grid includes resource elements. Each resource element is identified by the subband 220 and the SC-FDMA symbol 210. The resource elements are grouped into resource blocks. A resource block (RB) 300 includes of 12 consecutive subbands and six or seven consecutive SC-FDMA symbols. The number of SC-FDMA symbols depends on a length of a cyclic prefix (CP). For a normal cyclic prefix, the number of SC-FDMA symbols is 7 and for an extended cyclic prefix, the number of SC-FDMA symbols is 6.)

For the purpose of this specification and appended claims, we use the terms the subframe and the transmission time interval (TTI) interchangeably.

Figure 3B:
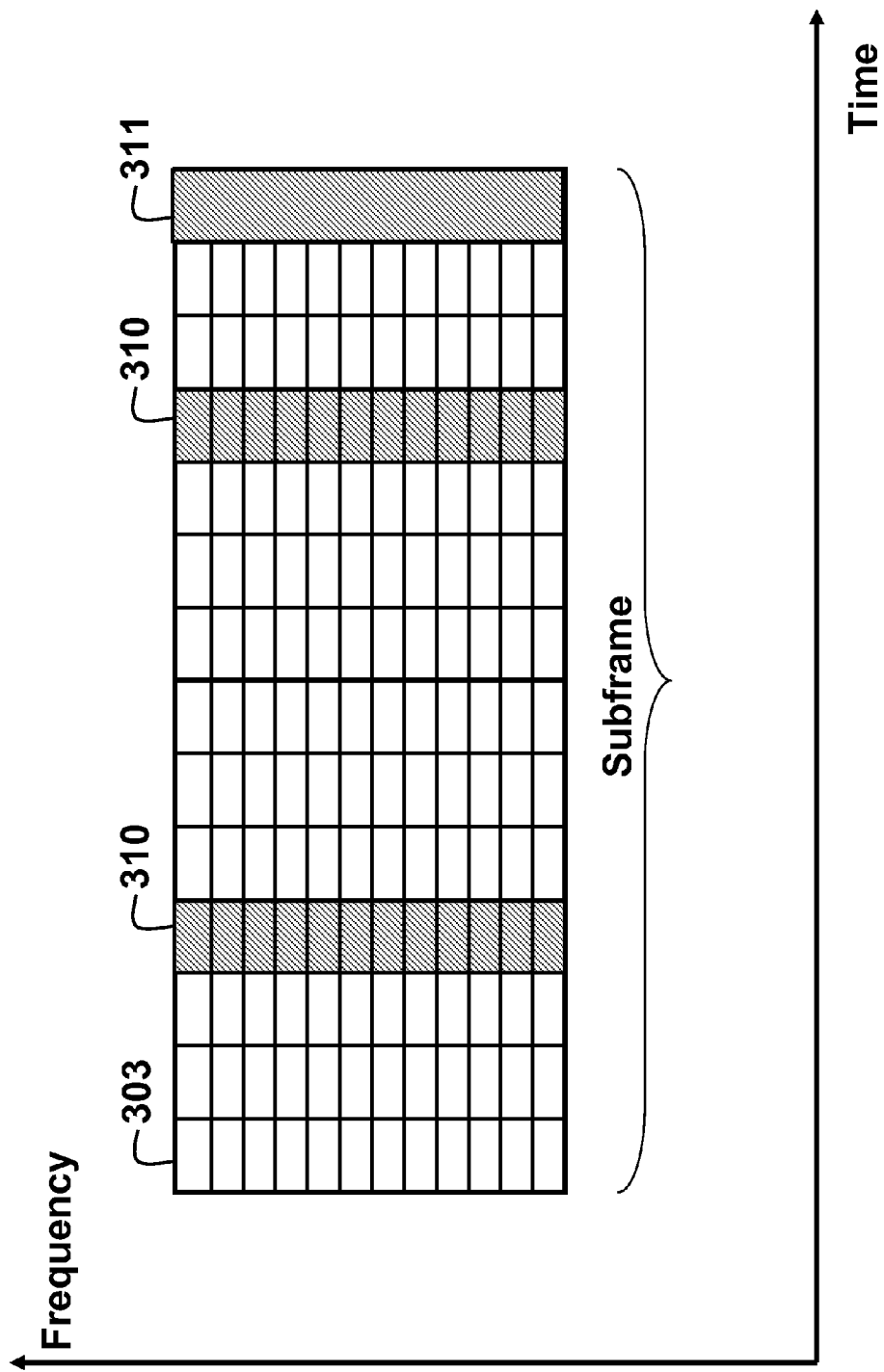
FIG. 3B is a block diagram of a resource block according to an embodiment of the invention.

FIG. 3B shows a structure of the resource block (RB) 300 with a conventional cyclic prefix. The vertical axis indicates frequency, and the horizontal axis indicates time. In the frequency domain, the resource block includes of a number of subbands. In the time domain, the RB is partitioned into SC-FDMA symbols, which may include data 303 and reference signals (RS) 310. Two types of the RS are used in the uplink: sounding reference signals (SRS) 311 and demodulation reference signals (DMRS) 310.

Both the SRS and the DMRS are generated using a constant amplitude zero autocorrelation sequence (CAZAC) sequence, such as a Zadoff-Chu sequence, as described in Section 5.5.1 of the TS 36.211 v8.5.0 standard. When the sequence length is not equal to the length possible for a Zadoff-Chu sequence, the sequence of desired length is generated by extending circularly a Zadoff-Chu sequence of length close to and less than the desired length, or by truncating a Zadoff-Chu sequence of length close to and greater than the desired length. The DMRS is transmitted in the fourth SC-FDMA symbol for normal cyclic prefix and in the third SC-FDMA symbol for the extended cyclic prefix. The SRS is typically transmitted in the last SC-FDMA symbol of the subframe, except for special subframes as described in TS 36.211 v8.5.0. However, the embodiments of the invention do not depend on the SC-FDMA symbol in which the RS is transmitted.

Antennas Selection

Typically, the RS is transmitted along with or separately from user data from different subsets of antennas. Based on the RSs, the BS, estimates channels and identifies the optimal subset of antennas for data transmission.

Figure 4:
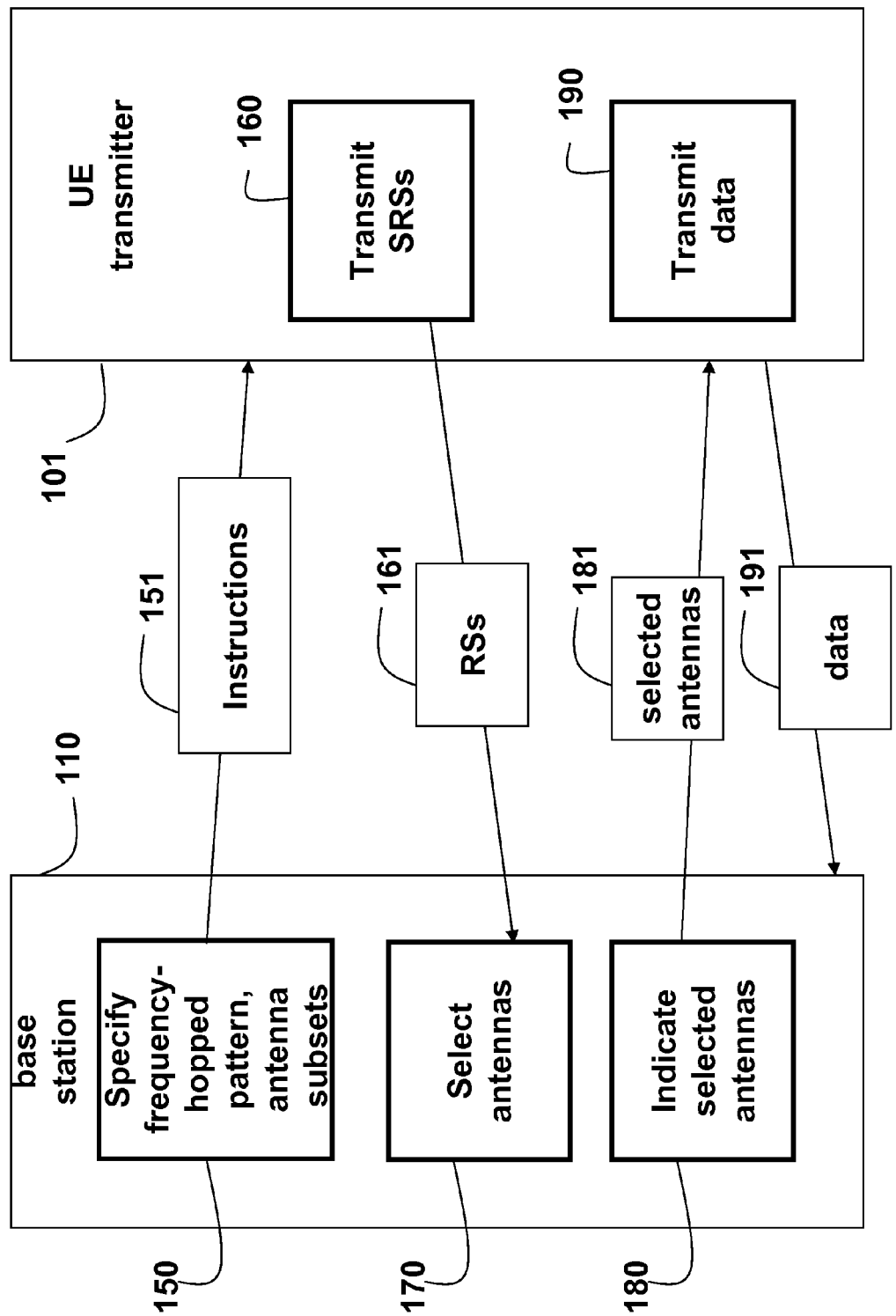
FIG. 4 is a block diagram of method for selecting antennas according to an embodiment of the invention.

FIG. 4 shows the basic method for selecting antennas according to an embodiment of the invention. The base station 110 specifies 150 instructions 151. e.g., frequency-hopped pattern and subsets of antennas to use for transmitting the RSs 161. The transmitter of the UE 101 transmits 160 the RSs 161 according to the instructions 151.

The BS selects 170 a subset of antennas 181 based on the received RSs. Then, the BS indicates 180 the selected subset of antenna 181 to the UE. Subsequently, the UE transmits 190 data 191 using the selected subset of antennas 181. The UE can also use the same subset of antennas for receiving transmitting data.

Sounding Reference Signal (SRS)

The SRS is usually a wideband or variable bandwidth signal. The SRS enables the BS to estimate a frequency response of the entire bandwidth, or only a portion thereof. The frequency response enables the BS to allocate resources such as uplink frequency-domain scheduling. According to the embodiment of the invention, the SRSs are also used for antenna selection.

Another option for LTE is to use a frequency-hopping (FH) pattern to transmit the SRS. Specifically, a hopping SRS, with a subband, is transmitted based on a pre-determined frequency hopping pattern. The hopped SRSs, over multiple transmissions, span a large portion of the entire bandwidth, or the entire available bandwidth. With frequency hopping, the probability that UE interfere with each other during training is decreased.

However, if the antenna selection is performed incorrectly, the frequency-hopped variable bandwidth SRS results in a small performance improvement, particularly if the UE is moving rapidly.

Figure 5:
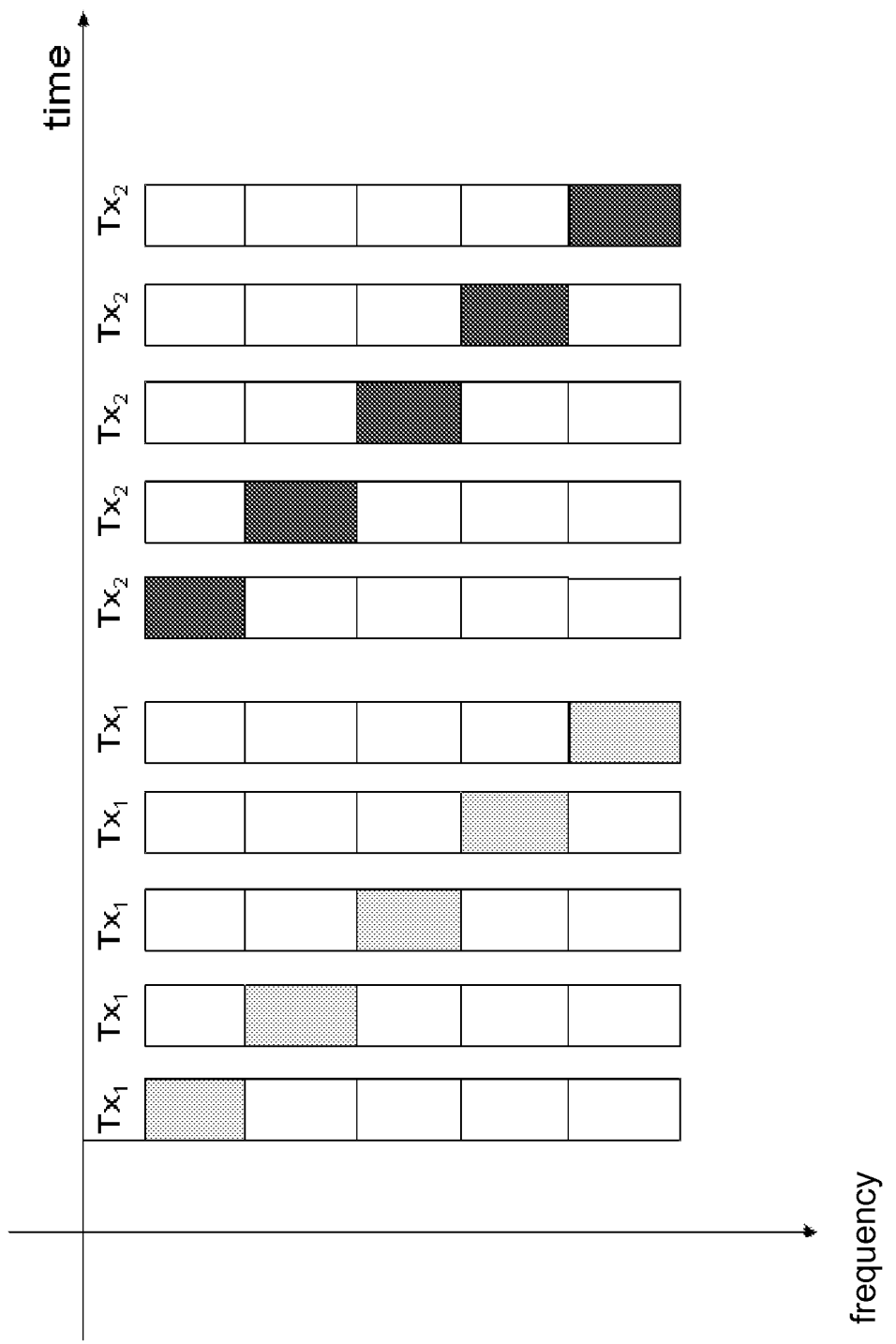
FIGS. 5-6 are block, diagrams of a frequency-hopped sounding reference signal (SRS) transmissions.

As shown in FIG. 5, all the subbands of antenna $Tx_1$ are successively sounded by the frequency-hopped SRS. Then, the subbands of antenna $Tx_2$ are successively sounded in a similar manner, as shown by the shaded blocks. However, the channel estimates obtained from this frequency-domain antenna selection pattern is quickly outdated. For example, at the end of sounding with antenna $Tx_2$, the channel estimates for antenna $Tx_1$ may no longer be valid.

Figure 6:
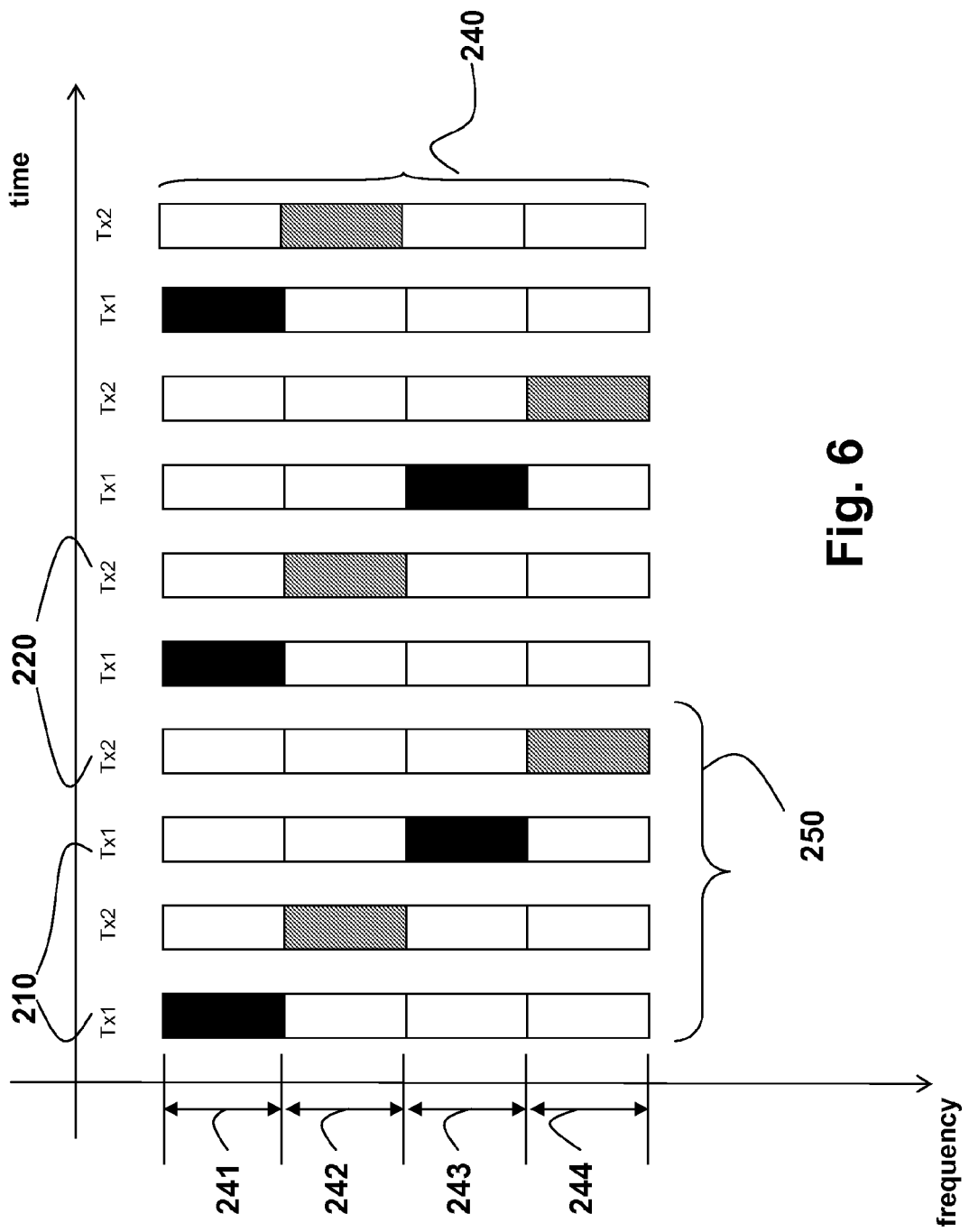

FIG. 6 shows subframes with frequency-hopped SRS transmitted alternately from the subsets of antennas. For example, the UE transmits the SRS alternately from two subsets of antennas, i.e., $Tx_1$ 210 and $Tx_2$ 220. The available bandwidth 240 is partitioned into four subbands 241-244, such that the SRS covers the bandwidth with four transmissions 250. The subband can occupy one multiple RBs.

In this training scenario, the SRSs for the subbands 241 and 243 are always transmitted from the subset of antennas $Tx_1$, and the SRSs for the subbands 242 and 244 are always transmitted from the subset of antennas $Tx_2$. Hence, the UE is not able to estimate the channel over entire frequency domain for each available subset of antennas.

Transmitting substantially alternately means that the alternating schedule changes over time. We assign an index for each subset of antennas, and antennas can be 'selected' or 'unselected.' For example, if the transceiver has two subsets of antennas, then the indexes are 0 and 1. The index pattern is [0, 1, 0, 1, 0, 1, 0, 1 . . . ], and [0, 1, 2, 0, 1, 2, 0, 1, 2, 0, 1, 2 . . . ] for three subsets.

Transmitting substantially alternately leads to an index pattern, e.g., [0, 1, 0, 1, 1, 0, 1, 0, 0, 1 . . . ]. For the transmitting substantially alternately, we periodically alter the index for the transmitting subset, e.g., shift or omit the indexes.

The index of the selected subset of antennas $a(n_{SRS})$ depends on the subframe number $n_{SRS}$ in which the SRS is transmitted and the number of the subset of antennas. Therefore, the index pattern above can be specified in, the form of a functional relationship between $a(n_{SRS})$ and $n_{SRS}$. The functional relationship depends on other parameters such as, but not limited to, the BS index and the length of the SRS sequence.

Figure 7:
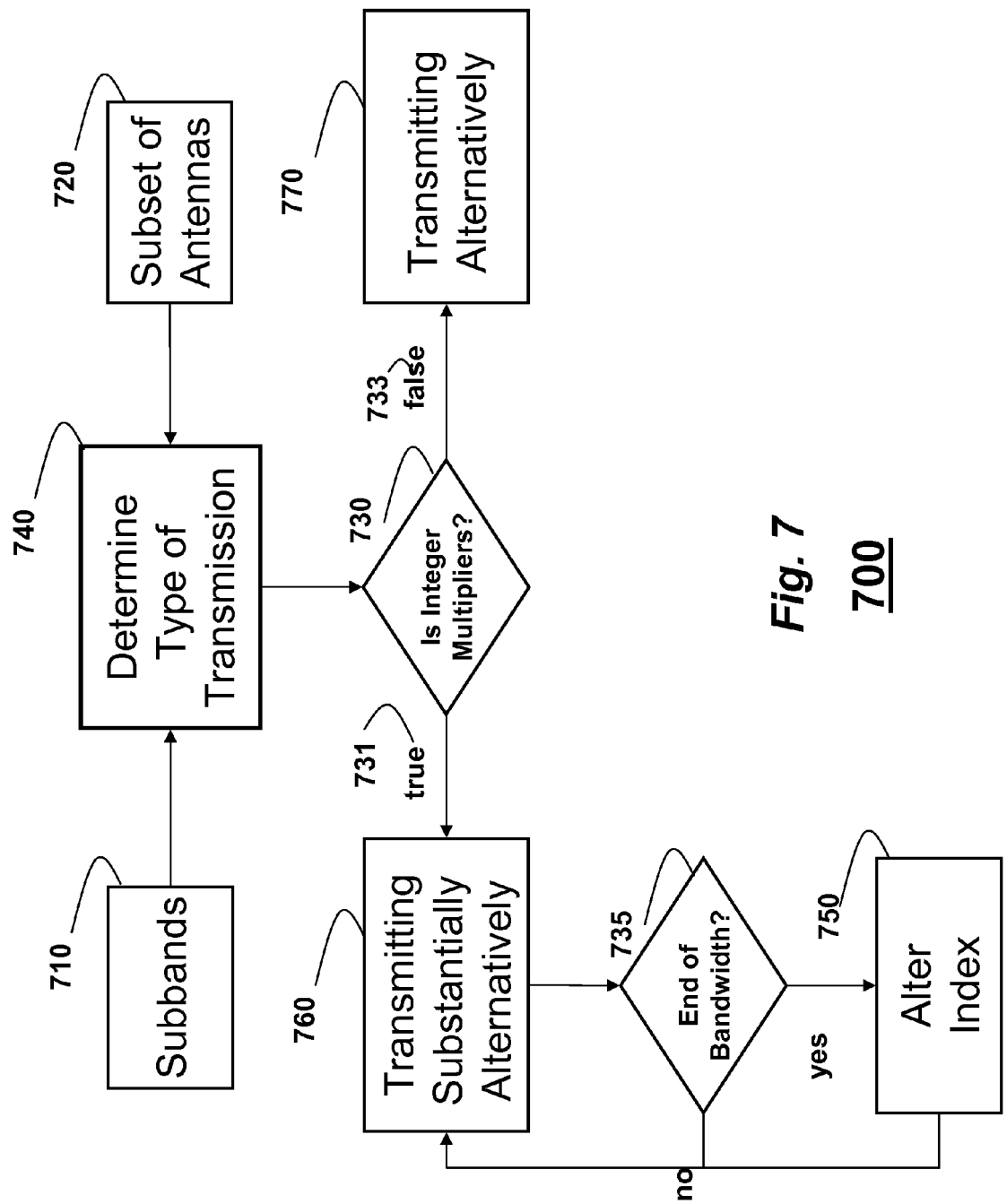
FIG. 7 is a block diagram of a method and a network for training subsets of antennas with the frequency-hopped SRS according to embodiments of the invention.

FIG. 7 shows a method 700 for training for the subset of antennas. We determine 740 a type of a transmission based on a relationship between the number of subbands 710 and the number of the subsets of transmit antennas 720. We determine whether the number of subbands is integer multiplier of the number of transmit antennas. If true 731, we transmit 760 the SRSs substantially alternately 760. For example, we alter an antenna index 750 every time when the end of the bandwidth is reached 735. In alternative embodiment, we alter the antenna index after the end or at the beginning of the frequency-hopped pattern. If false 730, we transmit the SRSs alternately.

Figure 8:
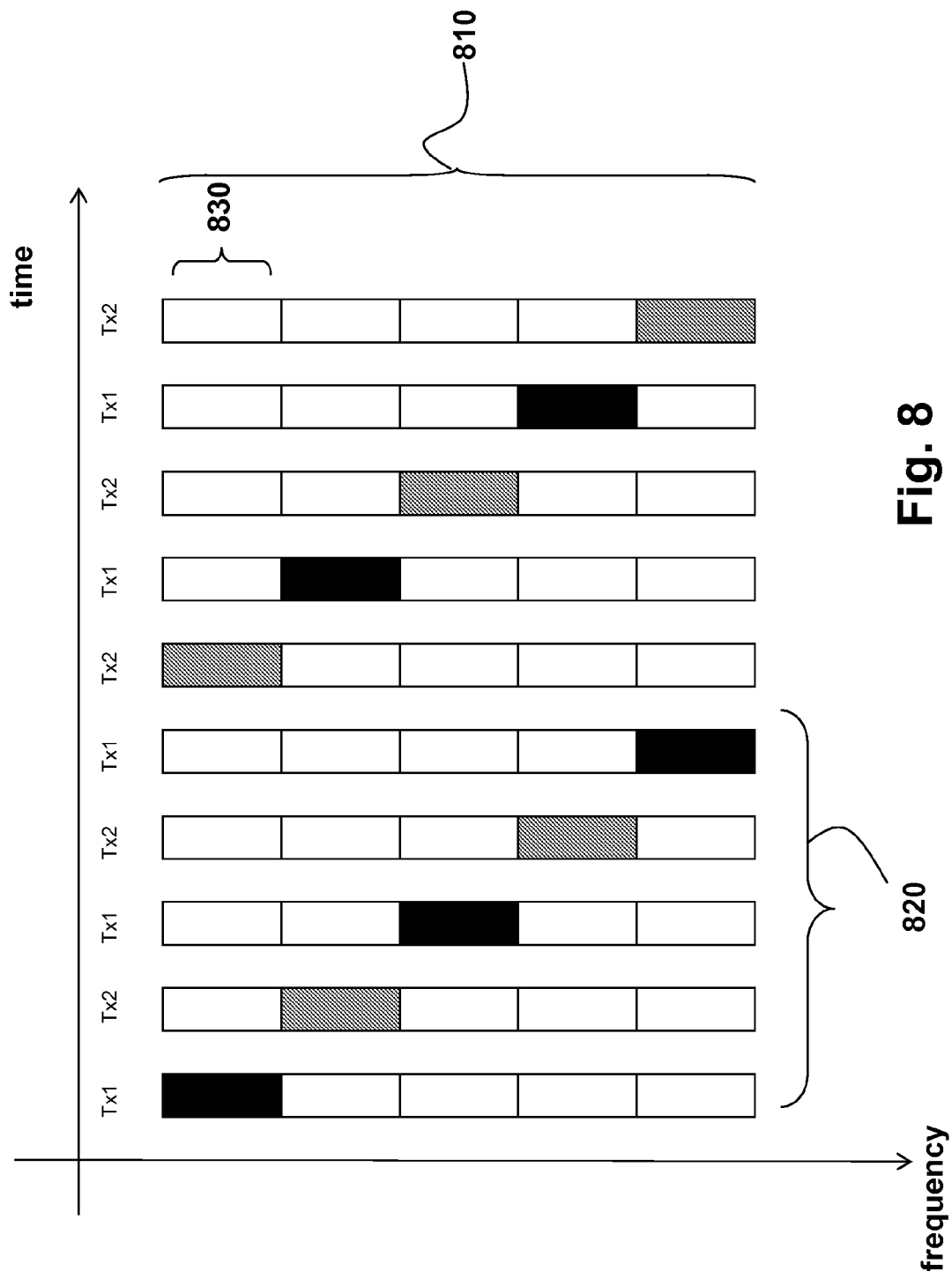
FIGS. 8-9 are block diagrams of a frequency-hopped sound reference signal (SRS) transmission patterns according to embodiments of the invention.

FIG. 8 shows a pattern for transmitting alternately the frequency-hopped SRS. The available bandwidth of B Hz 810 is partitioned into $N_f$ 830 subbands of bandwidth $$\frac{B}{N_f} Hz$$

each. If the number of subbands is odd, and the number of the subsets of antennas is even, then the number of subbands is not integer multiplier of the number of transmit antennas and the transmission from the two antennas Tx1 and Tx2 alternately results in a time-interleaved frequency hopping pattern 820.

Figure 9:
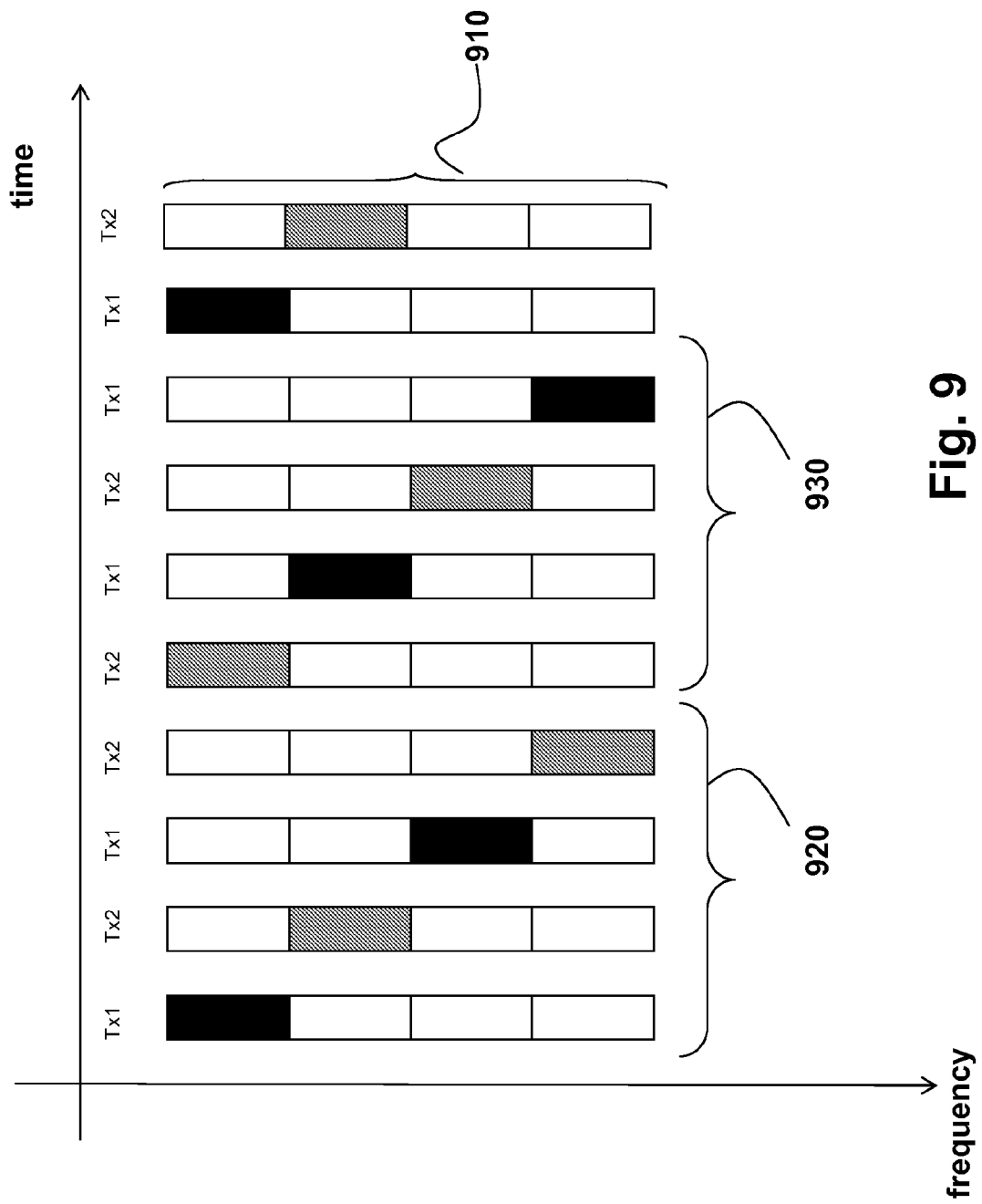

FIG. 9 shows another pattern. Here are four subbands and two antennas. When the transmission reaches the end of the bandwidth, e.g., a pattern of transmissions 920, we alter the indexes of the subset of the antennas. Thus, the next pattern of transmissions 930 starts with the subset of antennas $Tx_2$.

In one embodiment, the decision of which training pattern to use is made by the BS. The training pattern is transmitted to the UE as part of the instruction 151. In alternative embodiment, the UE has prior knowledge of the possible training patterns, and the instruction 151 only identifies the training pattern to use.

Frequency-Hopped SRS

Some embodiments of the invention use a subset of antennas index $a(n_{SRS})$ to allow the UEs to transmit over the entire bandwidth without interfering with each other. It is often desired to accommodate multiple UEs with different SRS bandwidths. By employing frequency-hopping with a code-tree based SRS configuration, multiple UEs are enabled to transmit orthogonal SRS with different bandwidths. Accordingly, to some embodiments, $n_{SRS}$ is an index of transmission of the SRS, e.g., time or transmission order number index, which is used to select the optimal subset of antennas.

Figure 10:
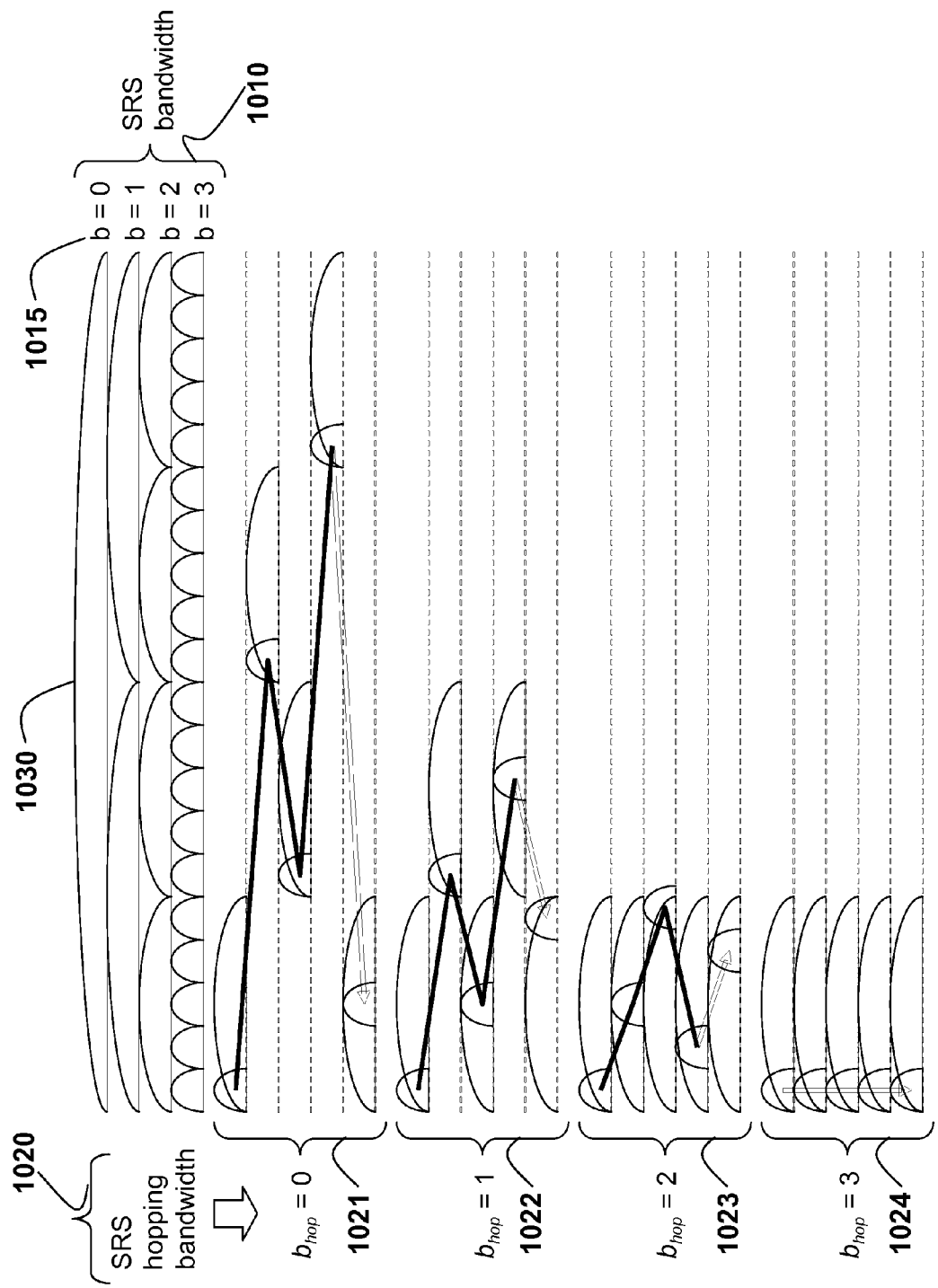
FIG. 10 is a schematic of hopping patterns according to a code-tree based SRS allocation.

FIG. 10 shows an example hopping patterns according to a code-tree based SRS allocation. The code-tree based SRS configuration is determined, in part, by the SRS bandwidth $B_{SRS}$ 1010 and by SRS hopping bandwidth $b_{hop}$ 1020. The SRS bandwidth $B_{SRS}$ depends on a level b 1015 of the code-tree 1030, e.g., h=0, 1, 2, and 3.

Different values of the SRS hopping bandwidth $b_{hop}$ typically lead to different code-tree based SRS bandwidth configurations 1021-1024. When the SRS hopping bandwidth is less than or equal to the SRS bandwidth, the frequency-hopping is disabled, as shown in the configuration 1024.

Figure 11:
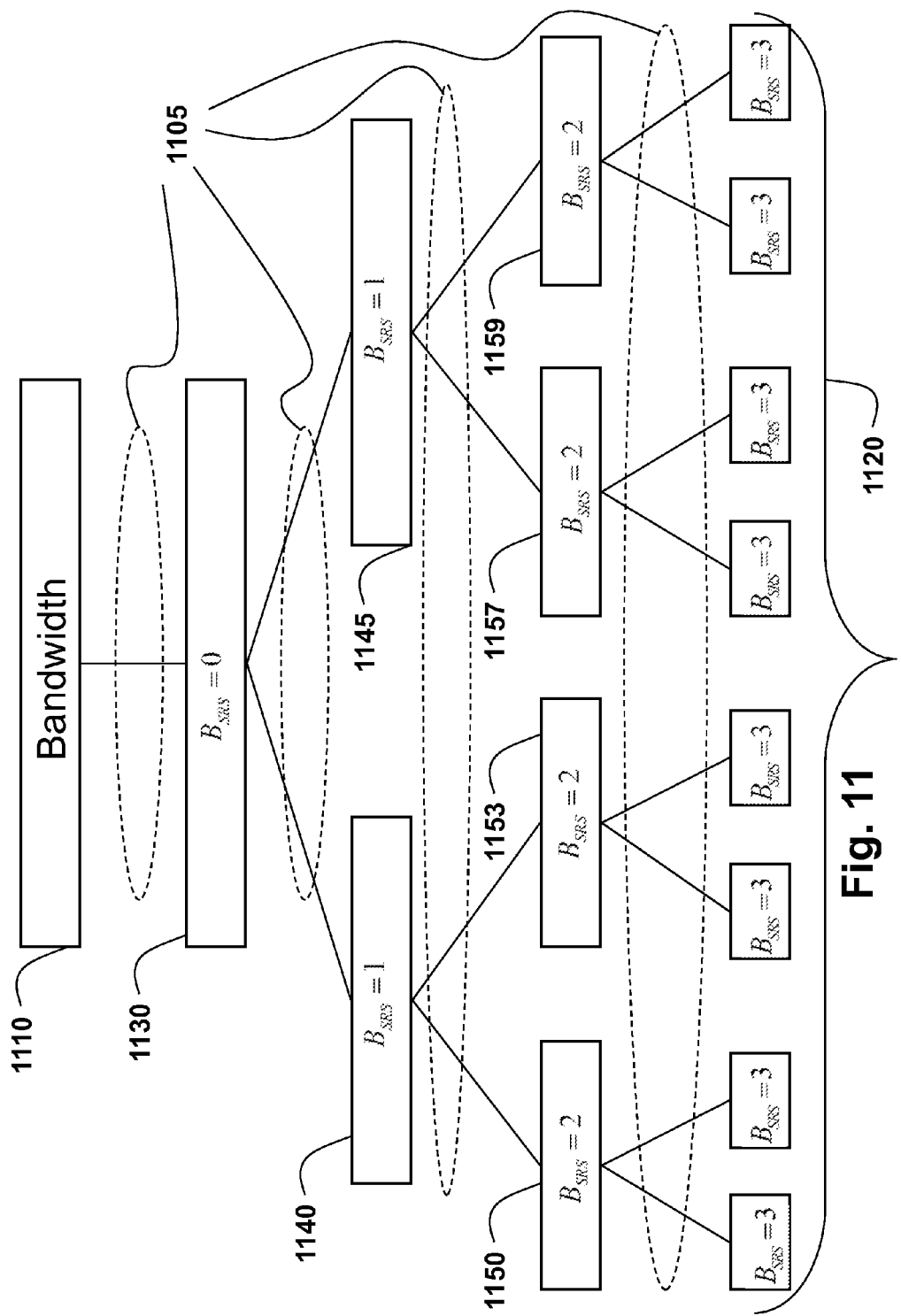
FIG. 11 is a block diagram of an example of the SRS bandwidth configuration.

FIG. 11 shows a code-tree based SRS bandwidth configuration. For every level b of the tree, the available bandwidth 1110, e.g., an uplink bandwidth $N_{RB}^{UL}$, is partitioned into a number of subbands. For example, the SRS bandwidth configuration of level 3, $B_{SRS}$=3, partitions the bandwidth 1110 into 8 subbands 1120. Typically, the available bandwidth is represented in a root node 1110 of the tree 1100.

The structure of the tree 1100 is similar to complete n-ary tree. The tree has a single root node 1110, intermediate nodes 1130, 1140 and 1150 that have children node, and leaf nodes 1120 that do not have children. The number of children n 1105 at a particular level is constant, but can vary among different levels. For example, the root node 1110 has one child, the node 1130. Accordingly, the number of children n equals 1. The node 1140 has two children, i.e., nodes 1150 and 1153. Accordingly, the number of children n equals 2. That also means that all siblings of the node 1140 should also have exactly two children. For example, a node 1145 has two children, i.e., nodes 1157 and 1159.

The structure of the tree 1100 can be used to determine a number of nodes in the level b of the tree by multiplying numbers n 1105 for each level from 0 to b. For example, according to the FIG. 11, the number of nodes at the level 2 (b=2) is 1×2×2=4. Similarly, number of leaf nodes 1120 at the level 3 1120 is 1×2×2×2=8.

The code-tree based SRS configuration utilizes the structure of the tree 1100. The SRS bandwidth configuration includes a partitioning coefficient. $N_b$, which is an analogous of the number of children n 1105. The partitioning coefficient $N_b$ indicates a number of the $b^{th}$ level subbands derived from a $(b-1)^{th}$ level subband. The SRS bandwidth configuration also includes a number of resource blocks (RB) $m_{SRS,b}$ in one subband $N_b$.

Figure 12:
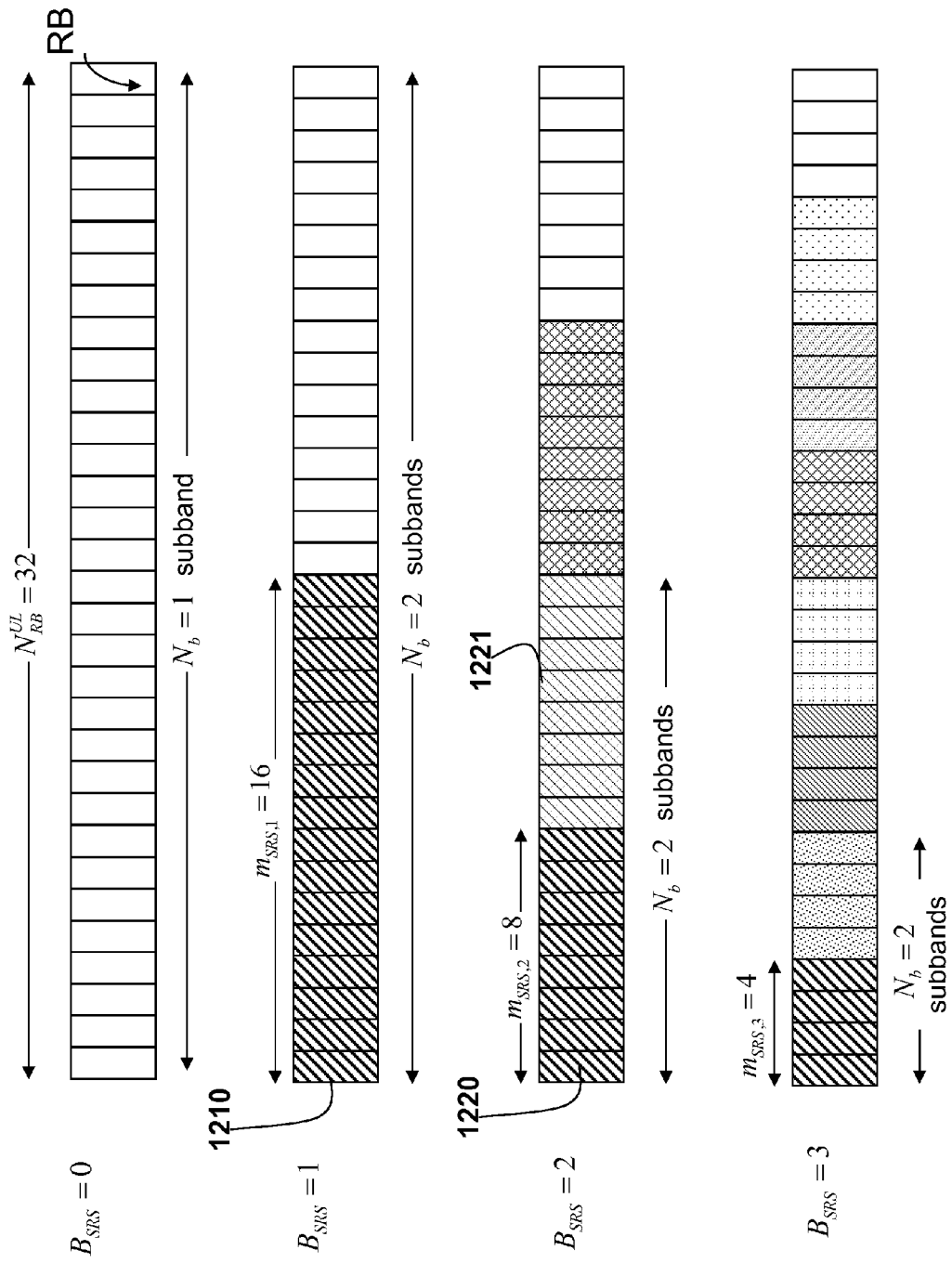
FIG. 12 is a block diagram of an example of the SRS bandwidth configuration using a tree data structure according embodiments of the invention.

FIG. 12 shows an example of the SRS bandwidth configuration. For example, the SRS bandwidth $B_{SRS}$=2, which corresponds to a third, b=2, level of the code-tree 1100 is partitioned into two subbands 1220 and 1221, i.e., the partition coefficient: $N_b$=2. Accordingly, knowing the partition coefficients for all levels of the tree allows for calculation of numbers of the subbands for any level of the tree. Hence, the SRS bandwidth configuration usually provide the partition coefficient N, for all levels of the tree b.

For example, in the SRS bandwidth configuration of FIG. 12, the partition coefficients for levels 0-3 are 1, 2, 2, and 2. Thus, the number of subbands at, e.g., level 3, is a product of the multiplication of different values $N_b$, i.e., 1×2×2×2=8. Several example SRS bandwidth configurations are described in Tables 1-5 of Appendix A.

Usually, the BS determines the SRS bandwidth configuration, in some embodiments, the SRS bandwidth configuration is identified by an index $C_{SRS}$, and the UEs are configured to select the SRS bandwidth configuration based on the index. In one embodiment, the UE stores the SRS bandwidth configuration identified by the index. The UE also receives the index from the BS. In these embodiments, the UE selects a particular subset of antennas based on the SRS bandwidth configuration.

Figure 13:
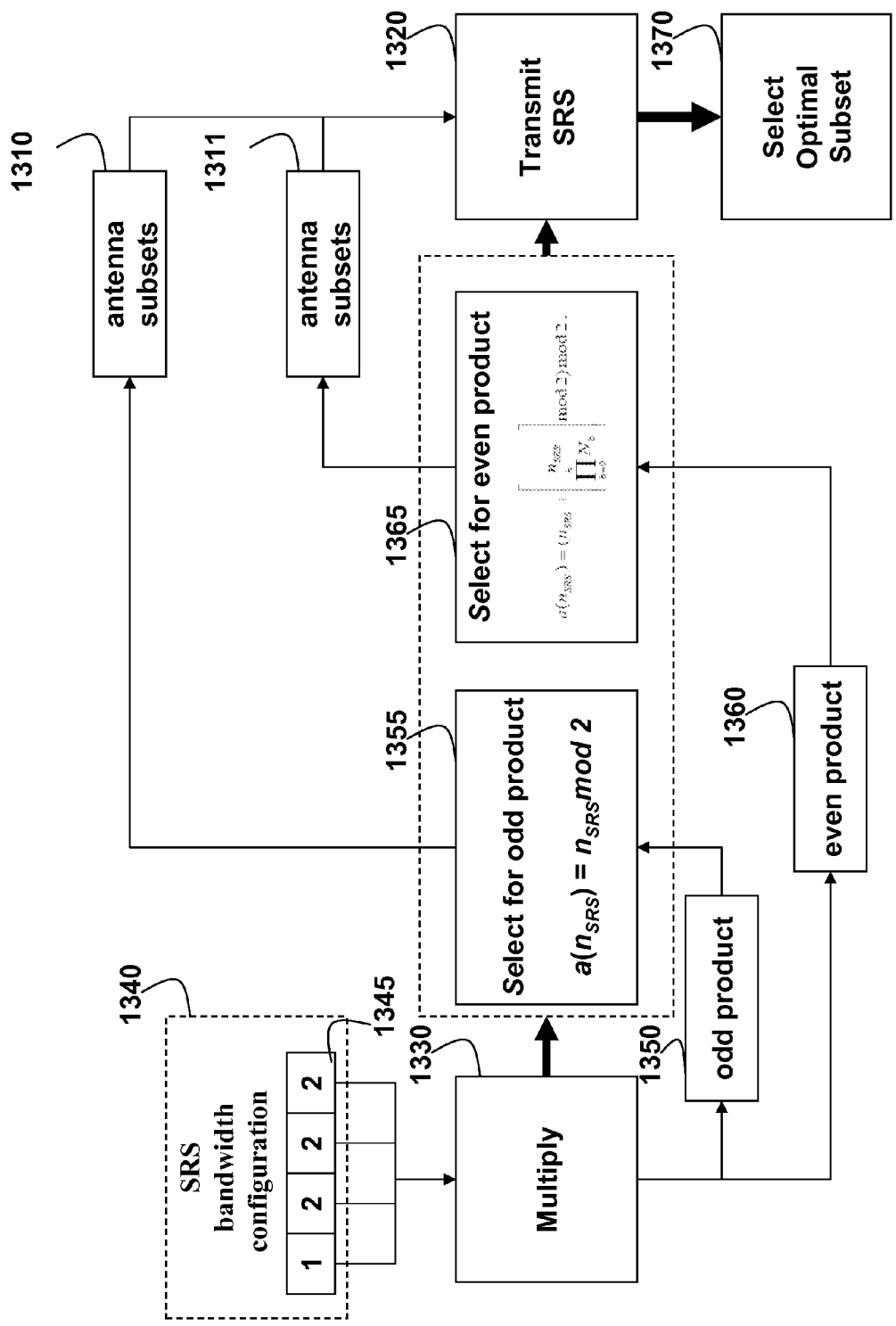
FIG. 13 is a block diagram of a method for selecting optimal subset of antennas from the set of antennas according embodiments of the invention.

As shown in FIG. 13, for an odd product 1350 produced by the multiplication 1330 of the partitioning coefficients 1345 defined by the SRS bandwidth configuration 1340, the method selects 1355 a subset of antennas 1310 for SRS transmission 1320. For an even product the method selects 1355 the antenna subset 1311.

The products 1350 and 1360 match the number of the subbands of the available bandwidth 1110. The SRS transmission is used by the BS to select 1370 the optimal subset of antennas for data transmission.

Usually, the antenna subsets 1310 and 1311 include multiple subsets of antennas. In one embodiment, the product is odd 1350, and the index parameter $a(n_{SRS})$ 1355 of the particular subset of antennas is $$a(n_{SRS})=n_{SRS} \bmod 2, \quad (1)$$

wherein $n_{SRS}$ is an index of the transmission of the SRS, i.e., counts, e.g., 1, 2 . . . , the number of SRS transmissions.

In alternative embodiment, the product 1360 is even, and then the index parameter $a(n_{SRS})$ 1265 of the particular subset of antennas is $$a(n_{SRS}) = \left(n_{SRS} + \left\lfloor \frac{n_{SRS}}{\prod_{b=0}^{b} N_b} \right\rfloor \bmod 2 \right) \bmod 2, \quad (2)$$

wherein $n_{SRS}$ is an index of a transmission of the SRS, b is a level of the code-tree based SRS configuration, and $N_b$ is the partitioning coefficient of the $b^{th}$ level of the code-tree based SRS configuration.

Figure 14:
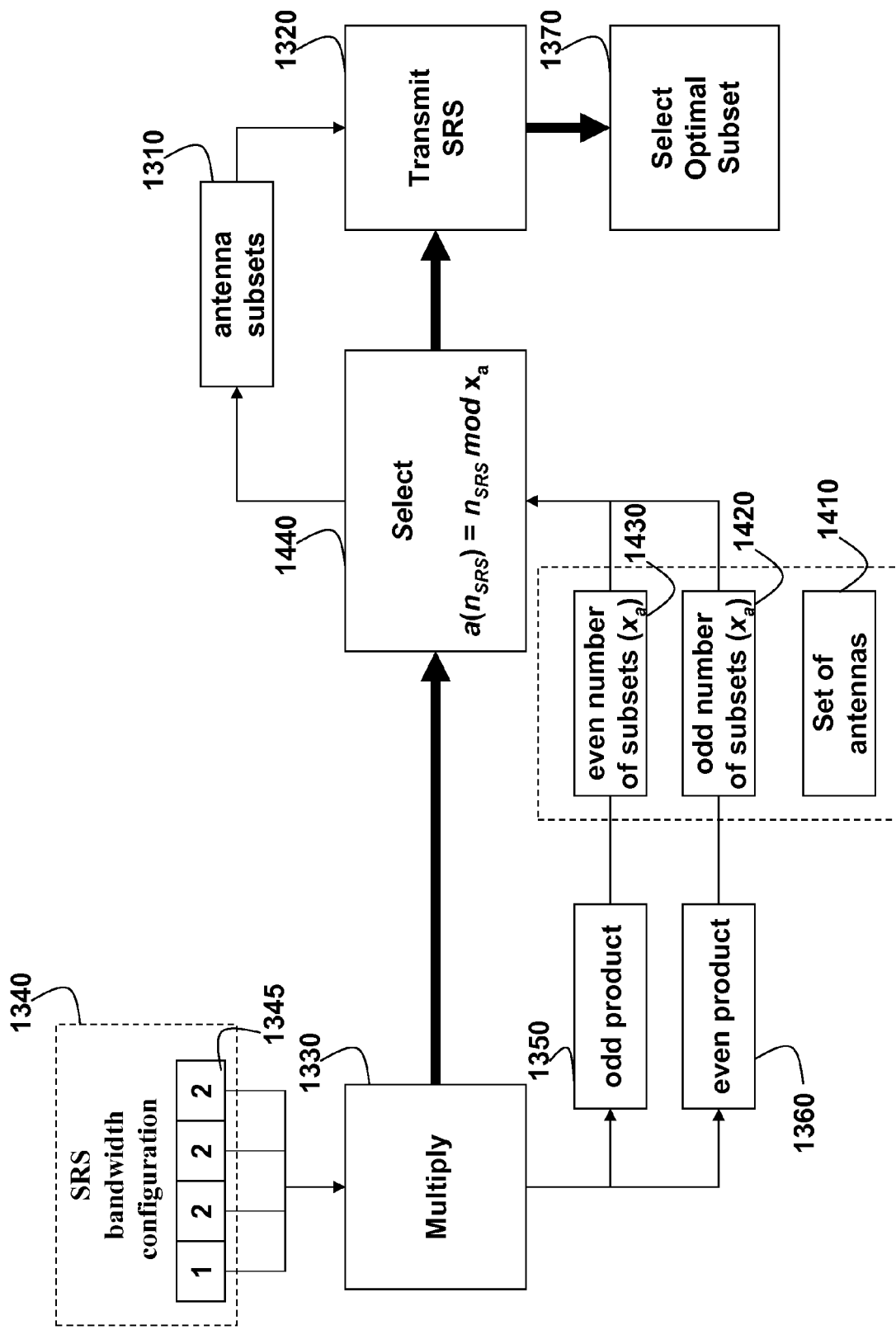
FIG. 14 is a block diagram of a method for selecting optimal subset of antennas from the set of antennas, which include arbitrarily number of subsets of antennas according another embodiment of the invention

FIG. 14 shows a block diagram of a method for selecting optimal subset of antennas from the set of antennas 1410, which include arbitrarily number of subsets of antennas $x_a$. If the product produced by the multiplication 1330 of the partition coefficients 1345 is odd 1350 and the number of subsets of antennas $x_a$ is even 1430, or, alternatively, the product is even 1360, but the number of subsets of antennas $x_a$ is odd 1420, the index parameter $a(n_{SRS})$ 1440 of the particular subset of antennas is $$a(n_{SRS})=n_{SRS} \bmod x_a, \quad (3)$$

wherein $n_{SRS}$ is an index of the transmission of the SRS, and $x_a$ is the number of subsets in the set of the antennas.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for selecting antennas for data transmission in a wireless communication network including user equipment (UE), wherein the network is assigned a band of frequencies, wherein the band is partitioned into at least one set of subbands of the band according to a sounding reference signal (SRS) bandwidth configuration, wherein the SRS bandwidth configuration is in a form of a code-tree having a plurality levels and each level is associated with a partition coefficient, and wherein the UE includes a set of antennas, and wherein the UE is configured to transmit frequency-hopped SRS on the set of subbands using subsets of the set of antennas, comprising in the UE a processor for performing steps of the method, comprising the steps of:

determining if a number of subbands in the set of the subbands is odd or even based on the SRS bandwidth configuration;

selecting a particular subset of the antennas according to whether the number is odd or even; and transmitting the SRS from the particular subset of the antennas to enable antenna selection for data transmission, wherein the determining further comprising:

selecting partition coefficients based on the SRS bandwidth configuration; and multiplying the partition coefficients to produce a product of the partition coefficients, such that the product equals the number of subbands.

2. The method of claim 1, wherein the number of subbands is odd, and wherein the selecting farther comprising:

determining an index parameter $a(n_{SRS})$ of the particular subset of antennas according to $$a(n_{SRS})=n_{SRS} \bmod 2,$$

wherein $n_{SRS}$ is an index of a transmission of the SRS.

3. The method of claim 1, wherein the number of subbands is even, and wherein the selecting further comprising:

determining an index parameter $a(n_{SRS})$ of the particular subset of antennas according to $$a(n_{SRS}) = \left(n_{SRS} + \left\lfloor \frac{n_{SRS}}{\prod_{b=0}^{b} N_b} \right\rfloor \bmod 2 \right) \bmod 2,$$

wherein $n_{SRS}$ is an index of a transmission of the SRS, b is a level of the segments in a code-tree based SRS allocation, and $N_b$ is a partitioning coefficient of the b level segments.

4. The method of claim 1, wherein the number of subbands is odd, and a number of subsets in the set of antennas is even, the selecting further comprising:

determining an index parameter $a(n_{SRS})$ of the particular subset of antennas according to $$a(n_{SRS})=n_{SRS} \bmod x_a,$$

wherein $n_{SRS}$ is an index of the transmission of the SRS, and $x_a$ is the number of subsets in the set of the antennas.

5. The method :of claim 1, wherein, the number of subbands is even, and a number of subsets in the set of antennas is odd, the selecting further comprising:

determining: an index parameter $a(n_{SRS})$ of the particular subset of antennas according to $$a(n_{SRS})=n_{SRS} \bmod x_a,$$

wherein $n_{SRS}$ is an index of the transmission of the SRS, and $x_a$ is the number of subsets in the set of the antennas.

6. The method of claim 1, further comprising:
receiving the SRS bandwidth configuration from a base station.

7. The method of claim 1, further comprising:
receiving an index of the SRS bandwidth configuration from a base station; and
selecting the SRS bandwidth configuration based on the index.

8. The method of claim 1, wherein the transmitting is associated with an index $n_{SRS}$ of a transmission of the SRS.

9. The method of claim 1, wherein the SRS bandwidth configuration is determined in part by SRS bandwidths and by SRS hopping bandwidths.

10. The method of claim 1, wherein the selecting further comprising:
determining an index parameter $a(n_{SRS})$ of the optimal subset of antennas according to $$a(n_{SRS})=n_{SRS} \bmod 2,$$

wherein $n_{SRS}$ is an index of a transmission of the SRS.

11. A wireless communication network, wherein the network is assigned a band of frequencies, wherein the band is partitioned in at least one set of subbands of the band according to a sounding reference signal (SRS) bandwidth configuration, wherein the SRS bandwidth configuration is in a form of a code-tree having a plurality levels, and each level is associated with a partition coefficient, the network comprising:
user equipment (UE), wherein the UE includes a set of antennas, and wherein the UE is configured to transmit a frequency-hopped SRS over the set of subbands using subsets of the set of antennas, and wherein the UE is configured to select a particular subset of the set of antennas based on whether a number of subbands in the set of the subbands is odd or even, wherein the number of the subbands is defined by the SRS bandwidth configuration.

12. The network of claim 11, wherein the SRS bandwidth configuration determines partition coefficients, such that a product of the partition coefficients equals the number of subbands, and wherein the UE is configured to multiply the partition coefficients.

13. The network of claim 11, wherein the UE further comprising:
a memory for storing the SRS bandwidth configuration, wherein the SRS bandwidth configuration is identified by an index; and
means for receiving the index from the base station.

14. currently amended) The network of claim 11, wherein the UE is further configured to determine an index parameter $a(n_{SRS})$ of the particular subset of antennas according to $a(n_{SRS})=n_{SRS} \bmod 2$ wherein $n_{SRS}$ is an index of a transmission of the SRS.

15. A user equipment (UE), comprising:
a set of antennas, wherein the UE is configured to transmit frequency-hopped sounding reference signal (SRS) using subsets of the set of antennas according to a SRS bandwidth configuration;
means for determining a number of subbands in the set of the subbands is odd or even, wherein the numbers of the subbands equals to a product of partition coefficients defined by the SRS bandwidth configuration;
means for selecting a particular subset of antennas based on the number of subbands; and
means for transmitting the SRS from the particular subsets of the antennas to select an optimal subset of antennas for data transmission.

16. The UE of claim 15, further comprising:
means for determining an index parameter $a(n_{SRS})$ of the optimal subset of antennas according to $$a(n_{SRS})=n_{SRS} \bmod 2,$$

wherein $n_{SRS}$ is an index of a transmission of the SRS.

17. The UE of claim 15, further comprising:
means for determining an index parameter $a(n_{SRS})$ of the optimal subset of antennas according to $$a(n_{SRS})=n_{SRS} \bmod x_a,$$

wherein $n_{SRS}$ is an index of the transmission of the SRS, and $x_a$ is a number of subsets in the set of the antennas.

* * * * *